(12) United States Patent
Hansen

(10) Patent No.: US 7,185,014 B1
(45) Date of Patent: Feb. 27, 2007

(54) RETRIEVING DATA FROM A SERVER

(75) Inventor: James R. Hansen, Franklin, MA (US)

(73) Assignee: Axeda Corporation, Foxboro, MA (US)

(*) Notice: Subject to any disclaimer, the term of this patent is extended or adjusted under 35 U.S.C. 154(b) by 606 days.

(21) Appl. No.: 09/667,737

(22) Filed: Sep. 22, 2000

(51) Int. Cl.
  *G06F 17/30* (2006.01)
(52) U.S. Cl. .......................................... 707/10; 707/1
(58) Field of Classification Search ............. 707/1, 707/2, 3, 4, 5, 6, 7, 8, 9, 10, 101, 102, 103, 707/104, 200, 201, 202, 203; 700/9, 83; 709/230; 710/13; 714/43
  See application file for complete search history.

(56) References Cited

U.S. PATENT DOCUMENTS

| | | | |
|---|---|---|---|
| 4,086,434 A | 4/1978 | Bocchi | |
| 4,412,292 A | 10/1983 | Sedam et al. | |
| 4,497,037 A | 1/1985 | Kato et al. | |
| 4,583,834 A | 4/1986 | Seko et al. | |
| 4,853,946 A | 8/1989 | Elliott et al. | |
| 4,962,368 A | 10/1990 | Dobrzanski et al. | |
| 4,964,065 A | 10/1990 | Hicks et al. | |
| 4,965,946 A | 10/1990 | Hegedus et al. | |
| 4,996,703 A | 2/1991 | Gray | |
| 5,038,319 A | 8/1991 | Carter et al. | |
| 5,057,866 A | 10/1991 | Hill, Jr. et al. | |
| 5,077,582 A | 12/1991 | Kravette et al. | |
| 5,084,875 A | 1/1992 | Weinberger et al. | |
| 5,129,080 A | 7/1992 | Smith | |
| 5,138,377 A | 8/1992 | Smith et al. | |
| 5,184,179 A | 2/1993 | Tarr et al. | |
| 5,204,699 A | 4/1993 | Birnbaum et al. | |
| 5,212,645 A | 5/1993 | Wildes et al. | |
| 5,214,772 A | 5/1993 | Weinberger et al. | |
| 5,216,461 A | 6/1993 | Maekawa et al. | |
| 5,220,380 A | 6/1993 | Hirata et al. | |
| 5,224,157 A | 6/1993 | Yamada et al. | |
| 5,243,382 A | 9/1993 | Takano et al. | |
| 5,257,069 A | 10/1993 | Hirata et al. | |
| 5,261,061 A | 11/1993 | Ju | |

(Continued)

FOREIGN PATENT DOCUMENTS

EP 1191744 A2 3/2002

(Continued)

OTHER PUBLICATIONS

Database WIP, Section EI, Week 200156, Abstract, Document No. XP002253876 (Korea Electronics & Telecom Res. Inst.) Derwent Publications, Ltd., London, GB, Mar. 5, 2001.

(Continued)

*Primary Examiner*—Yicun Wu
(74) *Attorney, Agent, or Firm*—Fish & Richardson P.C.

(57) ABSTRACT

A system includes a server and a controller embedded in a device. Both the server and the embedded controller are capable of communicating over a computer network. The embedded controller sends a command to the server over the computer network that identifies an instance of the device. In response, the server identifies the instance of the device based on the command, retrieves data that is specific to the instance of the device, and sends the data to the embedded controller over the computer network.

74 Claims, 3 Drawing Sheets

U.S. PATENT DOCUMENTS

| | | |
|---|---|---|
| 5,270,775 A | 12/1993 | Suzuki |
| 5,282,127 A | 1/1994 | Mii |
| 5,291,244 A | 3/1994 | Kajiwara et al. |
| 5,293,196 A | 3/1994 | Kaneko et al. |
| 5,297,034 A | 3/1994 | Weinstein |
| 5,297,256 A | 3/1994 | Wolstenholme et al. |
| 5,300,980 A | 4/1994 | Maekawa et al. |
| 5,303,005 A | 4/1994 | Takano et al. |
| 5,305,055 A | 4/1994 | Ebner et al. |
| 5,305,199 A | 4/1994 | LoBiondo et al. |
| 5,307,263 A | 4/1994 | Brown |
| 5,325,156 A | 6/1994 | Ulinski |
| 5,333,286 A | 7/1994 | Weinberger et al. |
| 5,335,048 A | 8/1994 | Takano et al. |
| 5,339,168 A | 8/1994 | Evanitsky et al. |
| 5,342,037 A | 8/1994 | Martin |
| 5,347,346 A | 9/1994 | Shimizu et al. |
| 5,359,391 A | 10/1994 | Kuroyanagi et al. |
| 5,361,265 A | 11/1994 | Weinberger et al. |
| 5,365,310 A | 11/1994 | Jenkins et al. |
| 5,367,667 A | 11/1994 | Wahlquist et al. |
| 5,369,469 A | 11/1994 | Leo et al. |
| 5,369,471 A | 11/1994 | Yamada |
| 5,369,472 A | 11/1994 | Raj et al. |
| 5,373,349 A | 12/1994 | Ito |
| 5,384,622 A | 1/1995 | Hirata et al. |
| 5,386,271 A | 1/1995 | Maekawa et al. |
| 5,392,095 A | 2/1995 | Siegel |
| 5,398,257 A | 3/1995 | Groenteman |
| 5,404,199 A | 4/1995 | Hirata et al. |
| 5,412,779 A | 5/1995 | Motoyama |
| 5,414,494 A | 5/1995 | Aikens et al. |
| 5,420,667 A | 5/1995 | Kaneko et al. |
| 5,424,808 A | 6/1995 | Maekawa et al. |
| 5,424,844 A | 6/1995 | Koyanagi et al. |
| 5,428,551 A | 6/1995 | Trainor et al. |
| 5,442,541 A | 8/1995 | Hube et al. |
| 5,444,517 A | 8/1995 | Nagashima |
| 5,444,851 A | 8/1995 | Woest |
| 5,446,522 A | 8/1995 | Tahara et al. |
| 5,452,057 A | 9/1995 | Imaizumi et al. |
| 5,459,552 A | 10/1995 | Ohira |
| 5,463,775 A | 10/1995 | DeWitt et al. |
| 5,469,353 A | 11/1995 | Pinsky et al. |
| 5,488,454 A | 1/1996 | Fukada et al. |
| 5,491,535 A | 2/1996 | Hirata et al. |
| 5,493,364 A | 2/1996 | Kuroyanagi et al. |
| 5,517,491 A | 5/1996 | Nanni et al. |
| 5,543,892 A | 8/1996 | Hirata et al. |
| 5,548,376 A | 8/1996 | Kikuno |
| 5,550,957 A | 8/1996 | Davidson, Jr. et al. |
| 5,555,191 A | 9/1996 | Hripcsak |
| 5,561,501 A | 10/1996 | Honma |
| 5,572,672 A | 11/1996 | Dewitt et al. |
| 5,586,254 A | 12/1996 | Kondo et al. |
| 5,594,529 A | 1/1997 | Yamashita et al. |
| 5,600,403 A | 2/1997 | Inoo |
| 5,603,060 A | 2/1997 | Weinberger et al. |
| 5,603,323 A | 2/1997 | Pflugrath et al. |
| 5,619,024 A | 4/1997 | Kolls |
| 5,631,724 A | 5/1997 | Sawada et al. |
| 5,636,008 A | 6/1997 | LoBiondo et al. |
| 5,636,333 A | 6/1997 | Davidson, Jr. et al. |
| 5,638,427 A | 6/1997 | Flemming et al. |
| 5,640,495 A | 6/1997 | Colbert et al. |
| 5,642,202 A | 6/1997 | Williams et al. |
| 5,642,208 A | 6/1997 | Takahashi et al. |
| 5,655,084 A | 8/1997 | Pinsky et al. |
| 5,659,794 A | 8/1997 | Caldarale et al. |
| 5,673,190 A | 9/1997 | Kahleck et al. |
| 5,675,744 A | 10/1997 | Tsujii |
| 5,677,775 A | 10/1997 | Yamaguchi et al. |
| 5,694,528 A | 12/1997 | Hube |
| 5,699,494 A | 12/1997 | Colbert et al. |
| 5,708,908 A | 1/1998 | Hirata et al. |
| 5,708,909 A | 1/1998 | Yamashita et al. |
| 5,715,393 A | 2/1998 | Naugle |
| 5,715,496 A | 2/1998 | Sawada et al. |
| 5,715,823 A | 2/1998 | Wood et al. |
| 5,720,015 A | 2/1998 | Martin et al. |
| 5,727,135 A | 3/1998 | Webb et al. |
| 5,732,212 A | 3/1998 | Perholz et al. |
| 5,736,965 A | 4/1998 | Mosebrook et al. |
| 5,740,801 A | 4/1998 | Branson |
| 5,745,268 A | 4/1998 | Eastvold et al. |
| 5,748,907 A | 5/1998 | Crane |
| 5,752,125 A | 5/1998 | Yamashita et al. |
| 5,752,128 A | 5/1998 | Yamashita |
| 5,752,917 A | 5/1998 | Fuchs |
| 5,761,529 A | 6/1998 | Raji et al. |
| 5,764,918 A | 6/1998 | Poulter |
| 5,768,516 A | 6/1998 | Sugishima |
| 5,772,585 A | 6/1998 | Lavin et al. |
| 5,774,052 A | 6/1998 | Hamm et al. |
| 5,786,994 A | 7/1998 | Friz et al. |
| 5,787,149 A | 7/1998 | Yousefi et al. |
| 5,787,278 A | 7/1998 | Barton et al. |
| 5,790,793 A | 8/1998 | Higley |
| 5,790,977 A | 8/1998 | Exekiel |
| 5,798,738 A | 8/1998 | Yamada |
| 5,801,964 A | 9/1998 | McCarthy |
| 5,809,237 A | 9/1998 | Watts et al. |
| 5,812,397 A | 9/1998 | Pech et al. |
| 5,812,874 A | 9/1998 | Yamashita et al. |
| 5,818,603 A | 10/1998 | Motoyama |
| 5,819,015 A | 10/1998 | Martin et al. |
| 5,819,110 A | 10/1998 | Motoyama |
| 5,822,221 A | 10/1998 | Groenteman |
| 5,828,943 A | 10/1998 | Brown |
| 5,835,816 A | 11/1998 | Sawada et al. |
| 5,844,550 A | 12/1998 | Trainor et al. |
| 5,845,230 A | 12/1998 | Lamberson |
| 5,857,967 A | 1/1999 | Frid et al. |
| 5,862,404 A | 1/1999 | Onaga |
| 5,865,745 A | 2/1999 | Schmitt et al. |
| 5,872,635 A | 2/1999 | Akiyama |
| 5,873,009 A | 2/1999 | Yamashita et al. |
| 5,873,659 A | 2/1999 | Edwards et al. |
| 5,878,746 A | 3/1999 | Lemelson et al. |
| 5,880,677 A | 3/1999 | Lestician |
| 5,884,072 A | 3/1999 | Rasmussen |
| 5,887,216 A | 3/1999 | Motoyama |
| 5,890,029 A | 3/1999 | Hirata et al. |
| 5,894,416 A | 4/1999 | Kuroyanagi et al. |
| 5,897,235 A | 4/1999 | Honma |
| 5,901,286 A | 5/1999 | Danknick et al. |
| 5,905,906 A | 5/1999 | Goffinet et al. |
| 5,909,493 A | 6/1999 | Motoyama |
| 5,911,095 A | 6/1999 | Atsumi et al. |
| 5,917,405 A | 6/1999 | Joao |
| 5,933,675 A | 8/1999 | Sawada et al. |
| 5,935,060 A | 8/1999 | Iliff |
| 5,956,487 A | 9/1999 | Venkatraman et al. |
| 5,956,698 A | 9/1999 | Lachese et al. |
| 5,968,116 A | 10/1999 | Day et al. |
| 5,970,149 A | 10/1999 | Johnson |
| 5,975,737 A | 11/1999 | Carter et al. .................. 700/9 |
| 6,003,061 A | 12/1999 | Jones et al. |
| 6,003,078 A | 12/1999 | Kodimer et al. |
| 6,006,045 A | 12/1999 | Miyawaki |
| 6,009,284 A | 12/1999 | Weinberger et al. |
| 6,012,088 A | 1/2000 | Li et al. |
| 6,014,631 A | 1/2000 | Teagarden et al. |
| 6,014,691 A | 1/2000 | Brewer et al. |

| | | | |
|---|---|---|---|
| 6,021,284 A | 2/2000 | Serizawa et al. |
| 6,022,315 A | 2/2000 | Iliff |
| 6,023,223 A | 2/2000 | Baxter, Jr. |
| 6,025,925 A | 2/2000 | Davidson, Jr. et al. |
| 6,031,964 A | 2/2000 | Anderson |
| 6,042,111 A | 3/2000 | Rivers et al. |
| 6,060,994 A | 5/2000 | Chen |
| 6,061,603 A | 5/2000 | Papadopoulos et al. |
| 6,064,915 A | 5/2000 | Kaneko et al. |
| 6,091,915 A | 7/2000 | Takagishi |
| 6,098,116 A | 8/2000 | Nixon et al. |
| 6,101,407 A | 8/2000 | Groezinger |
| 6,108,492 A | 8/2000 | Miyachi |
| 6,112,035 A | 8/2000 | Kuroyanagi et al. |
| 6,112,256 A | 8/2000 | Goffinet et al. |
| 6,115,489 A | 9/2000 | Gupta et al. |
| 6,119,934 A | 9/2000 | Kolls |
| 6,122,463 A | 9/2000 | Nagatani |
| 6,130,999 A | 10/2000 | Serizawa et al. |
| 6,139,177 A | 10/2000 | Venkatraman et al. |
| 6,152,365 A | 11/2000 | Kolls |
| 6,167,448 A | 12/2000 | Hemphill et al. |
| 6,181,331 B1 | 1/2001 | Trainor et al. |
| 6,189,113 B1 | 2/2001 | Rabb et al. |
| 6,196,735 B1 | 3/2001 | Inamine |
| 6,221,011 B1 | 4/2001 | Bardy |
| 6,230,199 B1 | 5/2001 | Revashetti et al. |
| 6,246,485 B1 | 6/2001 | Brown et al. |
| 6,256,668 B1 | 7/2001 | Slivka et al. |
| 6,260,148 B1 | 7/2001 | Aggarwal et al. |
| 6,260,248 B1 | 7/2001 | Cramer et al. |
| 6,282,454 B1 * | 8/2001 | Papadopoulos et al. ....... 700/83 |
| 6,282,711 B1 | 8/2001 | Halpern et al. |
| 6,286,038 B1 | 9/2001 | Reichmeyer et al. |
| 6,286,059 B1 | 9/2001 | Sugiura |
| 6,292,828 B1 | 9/2001 | Williams |
| 6,304,895 B1 | 10/2001 | Schneider et al. |
| 6,308,099 B1 | 10/2001 | Fox et al. |
| 6,311,024 B1 | 10/2001 | Serizawa et al. |
| 6,312,378 B1 | 11/2001 | Bardy |
| 6,317,783 B1 | 11/2001 | Freishtat et al. |
| 6,317,848 B1 | 11/2001 | Sorens et al. |
| 6,325,540 B1 | 12/2001 | Lounsberry et al. |
| 6,343,320 B1 | 1/2002 | Fairchild et al. |
| 6,356,949 B1 | 3/2002 | Katsandres et al. |
| 6,368,284 B1 | 4/2002 | Bardy |
| 6,370,582 B1 * | 4/2002 | Lim et al. ................... 709/230 |
| 6,377,162 B1 | 4/2002 | Delestienne et al. |
| 6,381,557 B1 | 4/2002 | Babula et al. |
| 6,397,212 B1 | 5/2002 | Biffar |
| 6,405,310 B1 | 6/2002 | Simpson |
| 6,406,426 B1 | 6/2002 | Reuss et al. |
| 6,415,023 B2 | 7/2002 | Iggulden |
| 6,426,798 B1 | 7/2002 | Yeung |
| 6,430,711 B1 | 8/2002 | Sekizawa |
| 6,434,572 B2 | 8/2002 | Derzay et al. |
| 6,437,692 B1 | 8/2002 | Petite et al. |
| 6,446,192 B1 | 9/2002 | Narasimhan et al. |
| 6,449,633 B1 | 9/2002 | Van et al. |
| 6,457,038 B1 | 9/2002 | Defosse |
| 6,462,831 B1 | 10/2002 | Akiyama |
| 6,466,971 B1 | 10/2002 | Humpleman et al. |
| 6,477,117 B1 | 11/2002 | Narayanaswami et al. |
| 6,487,513 B1 | 11/2002 | Eastvold et al. |
| 6,493,871 B1 | 12/2002 | McGuire et al. |
| 6,494,831 B1 | 12/2002 | Koritzinsky |
| 6,510,350 B1 | 1/2003 | Steen et al. |
| 6,523,130 B1 | 2/2003 | Hickman et al. |
| 6,529,848 B2 | 3/2003 | Sone |
| 6,549,612 B2 | 4/2003 | Gifford et al. |
| 6,560,611 B1 | 5/2003 | Nine et al. |
| 6,560,656 B1 * | 5/2003 | O'Sullivan et al. ......... 709/250 |
| 6,564,227 B2 | 5/2003 | Sakakibara et al. |
| 6,581,092 B1 | 6/2003 | Motoyama et al. |
| 6,581,094 B1 | 6/2003 | Gao |
| 6,587,812 B1 | 7/2003 | Takayama |
| 6,598,011 B1 | 7/2003 | Koritzinsky et al. |
| 6,601,159 B1 | 7/2003 | Smith et al. |
| 6,604,212 B2 | 8/2003 | Sekizawa et al. |
| 6,611,863 B1 | 8/2003 | Banginwar |
| 6,631,407 B1 | 10/2003 | Mukaiyama et al. |
| 6,636,899 B1 | 10/2003 | Rabb et al. |
| 6,651,110 B1 * | 11/2003 | Caspers et al. ................ 710/13 |
| 6,651,190 B1 * | 11/2003 | Worley et al. ................ 714/43 |
| 6,654,720 B1 | 11/2003 | Graham et al. |
| 6,670,810 B2 | 12/2003 | Duncan et al. |
| 6,681,349 B2 | 1/2004 | Sekizawa |
| 6,686,838 B1 | 2/2004 | Rezvani et al. |
| 6,691,106 B1 | 2/2004 | Sathyanarayan |
| 6,710,893 B1 | 3/2004 | Hou et al. |
| 6,711,618 B1 | 3/2004 | Danner et al. |
| 6,757,714 B1 | 6/2004 | Hansen |
| 6,832,373 B2 | 12/2004 | O'Neill |
| 6,834,298 B1 | 12/2004 | Singer et al. |
| 6,857,013 B2 | 2/2005 | Ramberg et al. |
| 2002/0006790 A1 | 1/2002 | Blumenstock et al. |
| 2002/0038320 A1 | 3/2002 | Brook |
| 2002/0064138 A1 | 5/2002 | Saito et al. |
| 2002/0138567 A1 | 9/2002 | Ogawa |
| 2002/0174085 A1 | 11/2002 | Nelson et al. |
| 2002/0178241 A1 | 11/2002 | Eriksson |
| 2003/0061403 A1 | 3/2003 | Miyata et al. |
| 2003/0118353 A1 | 6/2003 | Baller |
| 2003/0200285 A1 | 10/2003 | Hansen et al. |

FOREIGN PATENT DOCUMENTS

| | | |
|---|---|---|
| JP | 60-263162 | 12/1985 |
| JP | 06-062130 | 3/1994 |
| JP | 06062130 | 3/1994 |
| JP | 07325513 | 12/1995 |
| JP | 09163008 | 6/1997 |
| JP | 10190922 | 7/1998 |
| JP | 10224372 | 8/1998 |
| JP | 10-295788 | 4/2000 |
| JP | 2000-122952 | 4/2000 |
| JP | 200122952 | 4/2000 |
| WO | WO 98/20439 | 5/1998 |
| WO | WO98/20439 | 5/1998 |
| WO | WO98/33302 | 7/1998 |
| WO | WO98/38910 | 9/1998 |
| WO | WO 98/38910 | 9/1998 |
| WO | WO98/41943 | 9/1998 |
| WO | WO 98/41943 | 9/1998 |
| WO | WO 99/1336 | 4/1999 |
| WO | WO99/21336 | 4/1999 |
| WO | WO 99/21336 | 4/1999 |
| WO | WO 99/57649 | 11/1999 |
| WO | WO 99/57649 | 11/1999 |
| WO | WO 99/57837 | 11/1999 |
| WO | WO99/57838 | 11/1999 |
| WO | WO 99/57838 | 11/1999 |
| WO | WO 00/23894 | 4/2000 |
| WO | WO00/23894 | 4/2000 |
| WO | WO 02/10919 | 2/2002 |
| WO | WO 02/21239 | 3/2002 |
| WO | WO 02/21299 | 3/2002 |
| WO | WO 02/21414 | 3/2002 |
| WO | WO02/21414 | 3/2002 |
| WO | WO 02/21415 | 3/2002 |
| WO | WO 02/21777 | 3/2002 |
| WO | WO02/25501 | 3/2002 |
| WO | WO 02/25501 | 3/2002 |

WO WO 98/33302 3/2002

OTHER PUBLICATIONS

Box, et al., Simple Object Acces Protocol (SOAP) 1.1, Document No. XP002250270, May 8, 2000.
Edward Steinfeld, "Making the Change" Document No. XP002201937, Apr. 2000, Circuit Cellar Online.
International Search Report—PCT/US03/11707.
http://www.linuxjournal.com/article.php?sid=4195.
Steinfeld "From Standalone To Internet Appliance" circuit cellar online, 'online! Apr. 2000, pp. 1-7, XP002201937 retrieved from the internet: <url: http://www.chipcenter.com/circuitcell ar/apriloo/pdf/co4ooespdf.pdf>43,48, 'retrieved on 2002-06-1o.
"RomWebClient Embedded HTTP client 1-61 Toolkit" ALLEGROSOFT, 'Online! Jul. 9, 2000, pp. 1-2, XPOO2201938 Retrieved from the Internet: <URL: http://web. archive.org/web/2000070920 4234/http://www.allegrosoft.com/romwebclient.html> retrieved on Jun. 12, 2002 the whole document.
Allegro Software product release 1-61 overview Greenhills Software Inc., 'Online! Jun. 10, 2002, pp. 1-1, XPOO2201939 Retrieved from the Internet: URL: http://www.ghs. com/partners.allegro/<'retrieved on Jun. 10, 2002! the whole document.
Incremona, A., "Remote Service Diagnostics for Imaging Equipment: Today and Tomorrow," *Advanced Imaging*, 12(9):90(2) (1997).
Lassman, M. et al., "Modern Nuclear Medical Diagnostics with Efficient Gamma Cameras," *Electromedica*, 66(2):43-51 (1998).
International Search Report PCT/US01/29787.
"RomWebClient Embedded HTTP client 1-61 Toolkit" ALLEGROSOFT, 'Online! Jul. 9, 2000 (2000-07-091, pp. 1-2, Retrieved from the Internet: <URL: http://web. archive.org/web/2000070920 4234/http://www.allegrosoft.com/romwebclient.html> retrieved on Mar. 29, 2004, 2 pps.
Allegro Software product release 1-61 overview Greenhills Software Inc., 'Online! Jun. 10, 2002 (2002-06-1o), pp. 1-1, Retrieved from the Internet: URL: http://www. ghs.com/partners/allegro/<'retrieved on Mar. 29, 2004, 1 pg.
International Search Report PCT/US01/45198.
International Search Report PCT/US01/23651.
http://www.upnp.org/download/UPnPDA10_20000613.htm (pp. 1-52).
Steinfeld, Edward, "Internet-appliance technology automates test equipment", *EDN Magazine*, pp. 157-169 (2000).
Williams, Tom, "Java Goes To Work Controlling Networked Embedded Systems", *Computer Design*, 35:9:36-37 (1996).
Office Action from European Patent Office, in Application. No. 01 955 993.9-2211; dated Jan. 29, 2004.
Office Action dated Nov. 17, 2003, in U.S. Appl. No. 09/627,201.
Ennis, D., "CORBA and XML Integration in Enterprise Systems", IONA Technologies, Inc., www.iona.com/info/techcenter/ecoop2000apr17.pdf (2000).
Emmerich, W. et al., "Implementing Incremental Code Migration with XML", ISCE 2000, *ACM*, pp. 397-406 (2000).
Suresh, R. et al., "XML-based Data System for Earth Science Applications", *IEEE*, pp. 1214-1216 (2000).
WebMethods B2B Whitepaper; www.cs.wisc.edu/~vganti/papers/b2b_wpB2Bintegration.html.
Virtual Reality Transfer Protocol (VRTP); www.stl.nps.navy.mil/~brutzman/vrtp.
The Simple Times, vol. 7, No. 1, Mar. 1999; www.simple-times.org/pub/simple-times/issues/7-1.html.
Office Action dated Mar. 6, 2006, in U.S. Appl. No. 10/124,181.
"Siemens Medical, BJC Health System Extend deal to multivendor service," Medical Imaging News, vol. 6, No. 26, Jun. 27, 1997.
Mar. 8, 2005 Office Action from application 01 973 431.8.
Math Markup Language (Chapter 4): www.w3.org/TR/REC-MathML/chap4_4.html.
Memphis Educational Computer Connectivity Alliance (MECCA) www.mecca.org/~Itague/nsfnocostextension.html.
EBITS: Electronic Business & Information Technology for Society Research Consortium www.cs.dartmouth.edu/~makedon/cs188/proposal.html.

Xerox 190 Copier, Electronic Data Interface Operator Guide, ver. 1.0, 1989.
Lindley, David, "Xerox unveils copier that phones for help," Rochester Democrat and Chronicle, Mar. 28, 1990.
Rytting, Todd, "Dispensing the Goods, Embedded Style," Circuit Cellar Online, Oct. 1999.
Ennis, Darach, "Cobra and XML Integration in Enterprise Systems," Trinity College Dublin, IONA Technologies Inc.
Emmerich et al., "Implementing Incremental Code Migration with XML," University College London, 2000.
Suresh et al., "XML-Based Data Systems for Earth Science Applications," Raytheon Information Technology and Scientific Services, Lanham, MD, 2000.
Oct. 6, 1998, "Frequently Asked Questions about the Extensible Markup Language—The XML FAQ" Version 1.41 (http://www.oasis.open.org/cover/xmlFAQ141-19981006.html).
Jun. 20, 1997, Layman, et al., "XML-Data," Position Paper from Microsoft Corp. (http://www.oasis-open.org/cover/xml-data9706223.html).
Pfeiffer, R., "Tutorial 2: Writing XML Documents," 1999.
Luh, James C., "With several specs complete, XML enters widespread development," Internet World, Jan. 4, 1999.
Kimball, Ralph, "XML Will Make it Easier," Intelligent Enterprise (http://www.intelligententerprise.com/010507/webhouse1_1.jhtml).
Kovar, Joseph, "Xerox Unveils Expanded Channel Lineup; Also Plans to Introduce E-Mail, Queue Management Software," PC Expo, Jun. 18, 1999.
EmWare Press Release: "Motorola, Mitsubishi and National Semiconductor Join emWare's Embed The Internet Alliance," Chicago, IL, Mar. 2, 1999.
EmWare Press Release: "emWare's emLink (TM) Used to Internet-enable Welch Allyn's Vital Signs Monitor," Chicago, IL Mar. 2, 1999.
EmWare Press Release: "emWare, IBM Demonstrate Next Phase in Establishing Worldwide Access to Embedded Devices," Chicago, IL Mar. 2, 1999.
EmWare Press Release: "Invensys Selects emWare EMIT Device-Networking Software to Add Remote Monitoring and Control Capabilities to its Controller Products," Salt Lake City, Utah Jun. 14, 1999.
EmWare Press Release: "emWare Delivers EMIT 3.0 SDK Pro-A Complete Device Networking Kit for Developing End-to-end, Embedded Device Networking Solutions," Salt Lake City, Utah May 24, 1999.
EmWare Press Release: "emWare Announces Support for Sun Microsystems Jini Technology," Salt Lake City, Utah Feb. 17, 1999.
Trewitt, G., "Digital Network Systems Laboratory, NSL Technical Note TN-14, Using Tcl to Process HTML Forms".
Jennyc, Kenn S., "Linking Enterprise Business Systems to the Factory Floor," The Hewlett-Packard Journal, Article 9, May 1998.
Walsh, Norman, "XSL The Extensible Style Language: Styling XML Documents," New Architect Daily, Jan. 1999.
Pfeiffer, R., "XML Tutorials for Programmers: Tutorial 2: Writing XML Documents," (http://imb.com/xml).
Winer, Dave, "XML-RPC Specification," (http://XML-RPC.com), Jun. 15, 1999.
Layman, A, et al., "XML-Data," Microsoft Position Paper, Jun. 20, 1997 (http://www.oasis-open.org/cover/xml-data9706223.html).
Sep. 1995, *Medical Imaging*, East Providence, RI.
Eastvold, Roger, "Tiss and Tell," Medical Imaging, Sep. 1995.
Nov. 1996, *24x7*, HealthTech Publishing Company, Inc.
Wigget, Jeremy, "Intraview: Roger Eastvold of Orasis Inc.," *24x7*, Nov. 1996.
Dec. 27, 1995, *SCAN Diagnostic Imaging*, vol. 8, No. 24.
Winter 1992, *Field of View*, vol. 2, No. 3, Toshiba America Medical System, Inc.
Reagan, Kelly, "Technology for the Soul," OC Metro, Sep. 1, 1995.
"Remote Diagnostics: Strategic weapon in the war for multi-vendor service contracts," Tech Assessment, vol. 3, No. 12, Dec. 1995.
Eastvold, Roger, "Services: The Next Generation," The Professional Journal, vol. 20, No. 4.
Apr. 22, 2005 Literature Search by Keyword: CyberTAC.

Steinfeld, E., "Making the Change from Standalone to Internet Appliance," Circuit Cellar Online, Apr. 2000, pp. 1-7.

Allegro, RomWebClient Embedded HTTP client Toolkit: ALLEGROSOFT, Circuit Cellar Online, Sep. 7, 2000, pp. 1-2, XP-002201983, URL:http://web.archive.orgweb/20000709204234/http://www.allegrosoft.com/romwebclient.html.

"Allegro Software product release overview," Greenhills Software Inc., Jun. 10, 2002, p. 1, URL:http://www.ghs.com/partners/allegro/.

European Office Action mailed Jun. 6, 2005 for Application No. 01955993.9-2211/1305712.

Questra Preliminary Invalidity Contentions dated Apr. 29, 2005.

Box et al., Simple Object Acess Protocol (SOAP) 1.1 Document No. XP002250270, May 8, 2000.

XP-002253876, c:\epodata\sea\eplog\internal.log.

Issue 77: The Next Bang: The Expolosive Combination of Embedded Linuz, XML, and Instant Mess, http://www.linuxjournal.com/article.php?sid=4195, pp. 1-15.

CyberTAC & RadScape Presentation, May 1997.

CyberTAC from Virtual Impact Systems, Inc. Presentation.

CyberTAC Remote Support System Presentation.

Questra Applications Data Sheet.

CyberTAC Design Presentation.

Orasis Medical Services, Inc., Business Plan Copy No. 001, Nov. 1995.

McBride, R.A., "Security Considerations for Active Messages," ACM SIGICE Bulletin, vol. 22 (2), Oct. 1996.

Hanckmann, J., "Telescript: the emerging standard for intelligent messaging," Philips Telecommunications Review, vol. 52(1).

Lassman, M. et al., "Modern Nuclear Medical Diagnostics with Efficient Gamma Cameras," Electromedica 66(2):43-51 (1998).

Incremona, A. "Remote Service Diagnostics for Imaging Equipment: Today and Tomorrow," Advanced Imaging, 12(9):90(2) (1997).

"The Simple Times, The Quaterly Newsletter of SNMP Technology, Comment, and Events," vol. 7, No. 1, Mar. 1999; wwww.simple-times.org/pub/simple-times/issues/7-1.html.

Tom Williams, "Java Goes to Work Controlling Networked Embedded Systems," Computer Designes, Pennwell Publ. Littleton, MA 35:9:36-37, Aug. 1996.

Edward F. Steinfeld, "Internet-appliance technology automates test equipment," EDN Magazine, pp. 157-169, Oct. 2000, www.edbmag.com.

Database WIP, Section EI, Week 200156, Abstract, Document No. XP002253876 (Korea Electronics & Telecom Res Inst.) Derwent Publications, Ltd., London, GB, Mar. 5, 2001.

WebMethods B2B Whitepaper; www.cs.wisc.edu/~vganti/papers/b2b_wpB2Bintegration.html.

Virtual Reality Transfer Protocol (VRTP); www.stl.nps.navy.mil/~brutzman/vrtp.

Lerner, R., "Introducing SOAP," Linux Journal, pp. 62-70, Mar. 2001.

* cited by examiner

RETRIEVING DATA FROM A SERVER

BACKGROUND

This invention relates to a controller embedded in a device (an "embedded controller") that retrieves data from a remote server for a specific instance of the device.

A device may contain an embedded controller, such as a microprocessor, to monitor and control its operation. Any type of device may have an embedded controller, including, but not limited to, home appliances, such as washing machines, dishwashers, and televisions, and manufacturing equipment, such as robotics, conveyors and motors.

Embedded controllers, also referred to as "embedded devices", are often connected to an internal network, such as a local area network (LAN), with an interface to the Internet. Other devices on the internal network may communicate with the embedded controllers over the internal network. However, the embedded controllers are not generally addressable from the Internet.

SUMMARY

In general, in one aspect, the invention is directed to a controller embedded in a device for retrieving data from a server. The controller sends a command to the server that identifies an instance of the device and receives, from the server and in response to command, data that is specific to the instance of the device.

This aspect of the invention may include one or more of the following. The command may include an operational parameter for the device and the data may include an updated value for the operational parameter. The command may include plural operational parameters for the device and the data may include updated values that differ from current values of the operational parameters.

The data may include a list of operational parameters. In this case, the embedded controller sends a second command to the server, which includes operational parameters from the list, and receives, from the server and in response to second command, updated values of one or more of the operational parameters included in the second command. The data may include a list of operations to be performed by the controller. In this case, the embedded controller parses the operations from the list and performs the operations from the list.

The data may include a configuration file for the device. The command may identify the instance of the device by a device type and/or one or more of a serial number and a universal unique identifier. The embedded controller may send the command to the server periodically. The server may run the Hypertext Transfer Protocol and the command may contain Extensible Markup Language code.

In general, in another aspect, the invention is directed to a server for sending data over a network to a controller embedded in a device. The server receives a command from the embedded controller, identifies an instance of the device from information in the command, retrieves data that is specific to the instance of the device, and sends the data to the embedded controller.

This aspect of the invention may include one or more of the following features. The command may include a device type and/or one or more of a serial number and a universal unique identifier. The instance of the device may be identified based on the device type and/or one or more of the serial number and the universal unique identifier. The server may parse the device type and one or more of the serial number and universal unique identifier from the command prior to identifying the instance of the device.

The command may include an operational parameter for the device. The data may include an updated value of the operational parameter. The data may include a list of operational parameters for the device. The server receives a second command from the embedded controller, which includes an operational parameter from the list of operational parameters, obtains an updated value of the operational parameter, and sends the updated value of the operational parameter to the embedded controller.

The data may include a list of operations to be performed by the embedded controller. The data may include a configuration file for the device. The server may receive the data specific to the instance of the device and store the data in memory, from which it is retrieved. The data specific to the instance of the device may be received via a Web page generated by the server. The server may run the Hypertext Transfer Protocol and the command may contain Extensible Markup Language code.

In general, in another aspect, the invention is directed to a system that includes a controller embedded in a device that is capable of communicating over a computer network, and a server that is capable of communicating over the computer network. The embedded controller sends a command to the server over the computer network that identifies an instance of the device and, in response, the server (i) identifies the instance of the device based on the command, (ii) retrieves data that is specific to the instance of the device, and (iii) sends the data to the embedded controller over the computer network.

This aspect of the invention may include one or more of the following features. The embedded controller is not remotely-addressable from the computer network. The computer network is the Internet. The server runs the Hypertext Transfer Protocol and the command may contain Extensible Markup Language code.

Other features and advantages of the invention will become apparent from the following description, including the claims and drawings.

DESCRIPTION

Figure 1:
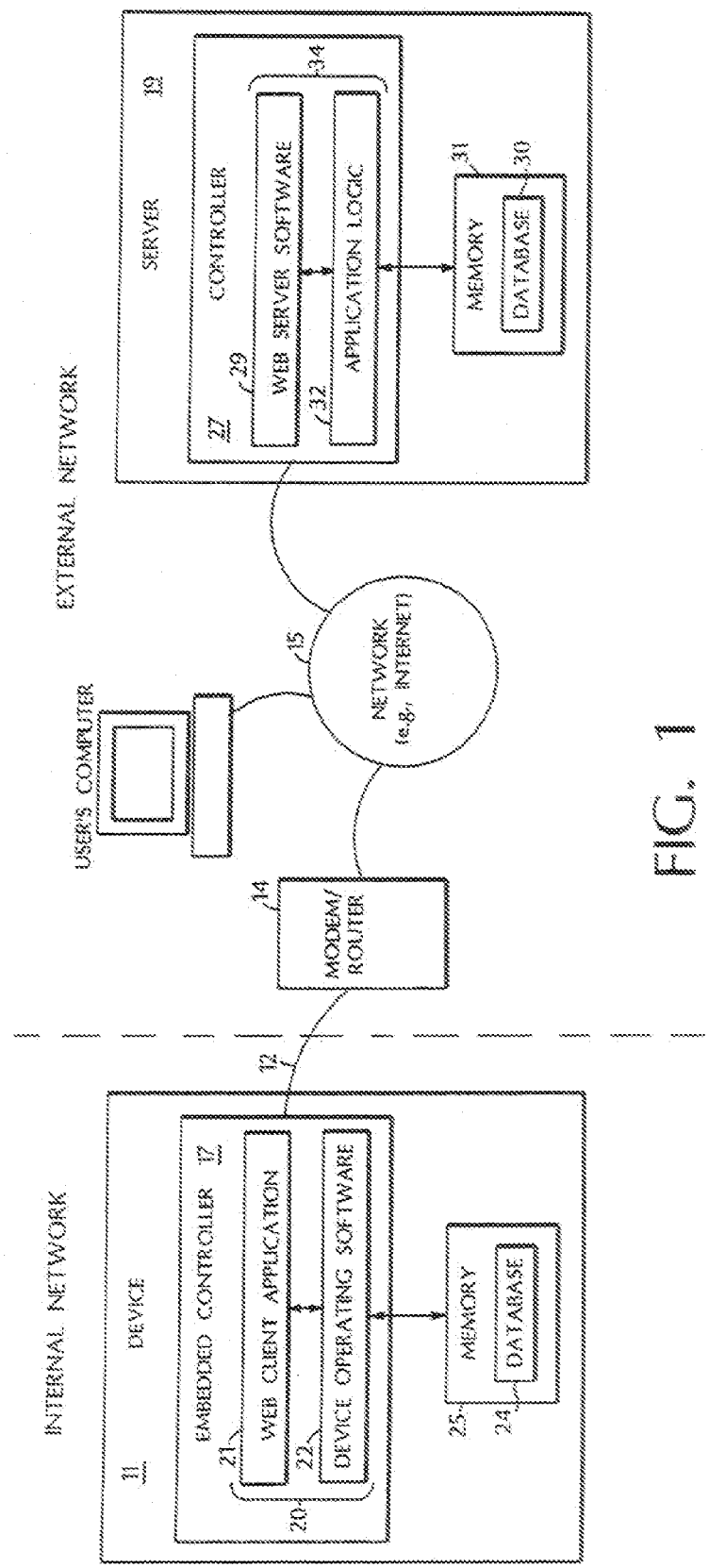
FIG. 1 is a block diagram of a network containing a server and a device having an embedded controller.

FIG. 1 shows a network 10. Network 10 includes a device 11 containing an embedded controller 17. Device 11 is any type of apparatus or system having functions that are monitored and controlled by embedded controller 17.

Device 11 is connected to an internal network 12, such as a LAN. A router or modem 14 couples internal network 12 to an external network 15, such as the Internet/World Wide Web (Web). External network 15 runs TCP/IP (Transmission Control Protocol/Internet Protocol) or some other suitable protocol. Network connections are via Ethernet, telephone line, wireless, or other transmission media.

External network 15 contains a server 19, which is a computer or any other processing device. Server 19 communicates with embedded controller 17 over external network 15 and internal network 12. Embedded controller 17 has a local IP (Internet Protocol) address that can be resolved within internal network 12. However, this local IP address may not be recognizable by devices on external network 15, such as server 19. As such, server 19 may not be able to directly address device 11.

Embedded Controller

Embedded controller 17 runs software 20, which includes web client application 21 and operating software 22. Web client application 21 includes a TCP/IP protocol stack that allows embedded controller 17 to communicate over external network 15. Device operating software 22 provides an interface between Web client application 21 and a database 24. Through device operating software 22, embedded controller 17 retrieves data stored in database 24 and stores data in database 24.

Database 24 is stored in a memory 25 on device 11 or internal to embedded controller 17. Database 24 stores data, including operational parameters, configuration files, and identification information for device 11.

The operational parameters constitute settings and/or control instructions for the device 11, which are implemented by embedded controller 17. The types of operational parameters that are stored in database 24 depend on the nature of device 11. For example, if device 11 is a heating/cooling system, the operational parameters may include temperature levels, humidity levels, airflow controls, vent/duct open/close controls, and fan motor speed settings. A configuration file is a file that contains a set of one or more operational parameters for an instance of device 11.

What is meant by "instance" is the specific identity of device 11 as distinguished from other identical devices. The identification information stored in database 24 identifies the instance of device 11. This identification information includes, but is not limited to, data identifying the type of the device, a common (or "friendly") name for the device, the manufacturer of the device, the model name of the device, the model number of the device, the serial number of the device, and a universal unique identifier (UUID) for the device.

The device type specifies a uniform resource locator (URL) for the device, which includes the name of the device. This information identifies a Web site that is associated with, and generated by, server 19 for the device. For example, a device type might be:

www.SonyVideo.com/television/Vega/XBR400 for a Sony® Vega® XBR400® television that includes an embedded controller. The common name of the device is how the device is known in the vernacular, e.g., "television". The manufacturer identifies the manufacturer of the device, e.g., Sony®. The model name identifies the particular model of the device, e.g., Vega®. The model number identifies the model number of the device, e.g., XBR400®. The serial number identifies the serial number of a particular instance of the device, e.g., 53266D. The UUID is a universal identifier for the instance of the device, e.g., 4A89EA70-73B4-11d4-80DF-005DAB7BAC5. Of the data shown above, only the serial number and the UUID are unique to the instance of device 11.

Server

Server 19 is a computer that runs HTTP (Hypertext Transfer Protocol). Server 19 includes a controller 27, such as a microprocessor, for executing software to perform the functions described below. To avoid confusion in terminology, the following reads as though those functions are performed by server 19, even though software in controller 27 of server 19 performs the functions.

Server 19 executes Web server software 29 to communicate over external network 15. Web server software 29 also hosts a Web page associated with device 11. The Web page (not shown) is displayed on the computer of a user, such as the owner of device 11, who may input updated operational parameters for the device. These input updated operational parameters are transmitted to Web server software 29 over external network 15. Web server software 29 stores the updated parameters in database 30.

Web server software 29 stores and retrieves data in database 30 using application logic 32. Application logic 32 is software for accessing database 30 using the CGI (Common Gateway Interface) protocol. CGI is a well-known protocol for accessing a database. The operational parameters can be stored in database 30 individually or as part of a configuration file for an instance of device 11.

Database 30 is stored in a memory 31, which is inside of, or external to, server 19. Database 30 stores data associated with device 11, including the operational parameters noted above. Other data that may be stored for device 11 is described below.

The Data Transfer Process

Figure 2:
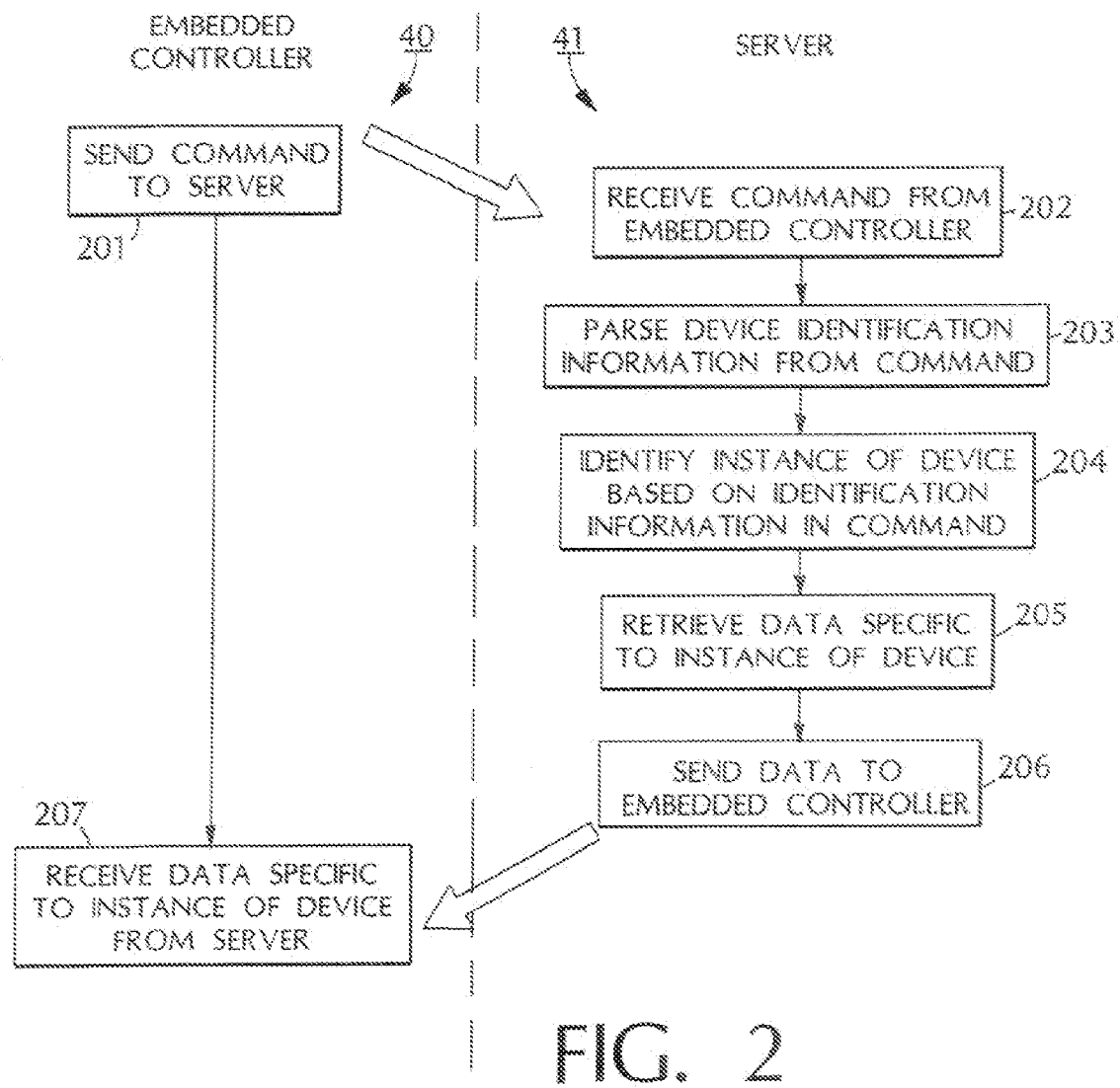
FIG. 2 is a flowchart showing a process by which the embedded controller retrieves data for the device from the server.

Embedded controller 17 executes software 20 to retrieve data, such as operational parameters, from remote server 19. Server 19 executes software 34 to send the data to embedded controller 17. FIG. 2 shows these processes in detail. The left half of FIG. 2, titled "Embedded Controller" shows process 40 performed by embedded controller 17, and the right half of FIG. 2, titled, "Server", shows process 41 performed by server 19.

Process 40 generates and sends (201) a command to server 19. The command, or a modified version thereof, is sent by embedded controller 17 to server 19 periodically. It is through this command that embedded controller 17 polls server 19 to determine if there are any new/updated operational parameters for device 11.

The command includes data identifying device 11. The data identifies the specific instance of device 11 and includes a device type field and one or both of a device serial number field and a device UUID. The command may also include the common name field, the manufacturer name field, the model name field, and the model number field, as set forth above.

The command may be either an HTTP GET command or an HTTP post command. The data included in those commands is similar, with the difference being that the HTTP GET command retrieves a document, such as a configuration file, that contains operational parameters and the HTTP POST command retrieves individual operational parameters. An example of an HTTP GET command is shown in Appendix A and an example of an HTTP POST command is shown in Appendix B.

The HTTP POST and GET commands shown in Appendices A and B contain XML (extensible Markup Language) commands. XML is a self-describing computer language in the sense that fields in the XML code identify variables and their values in the XML code. For example, as shown in the Appendices, the "manufacturer" field identifies a manufacturer, e.g., Sony®, and is delineated by "<manufacturer>" to indicate the start of the field and "</manufacturer>" to indicate the end of the field. XML is used because it can be generated, parsed and read relatively easily by server 19 and embedded controller 17.

As noted, the GET command is used to retrieve a document from server 19. The document to be retrieved corresponds to the fields in the GET command, in particular to the device type, serial number and/or UUID fields. By contrast, the POST command is used to retrieve individual operational parameters. The operational parameters that are to be retrieved are listed in the POST command itself. For example, as shown in Appendix B, the operational parameters include airflow, humidity, motor and vent values for the fictitious "widget" device. The current values of these parameters are specified in the POST command shown in Appendix B as follows:

<parameters>
  <Airflow xsd:type="integer">378</Airflow>
  <Humidity xsd:type="double">46.7</Humidity>
  <Motor xsd:type="integer">1500</Motor>
  <Vent xsd:type="integer">4</Vent>
</parameters>

The updated values of these parameters are returned by server 19 to embedded controller 17 in a reply POST command. The updated values of these parameters are specified in the POST command shown in Appendix B as follows:

<parameters>
  <Motor xsd:type="integer">1250</ Motor >
  <Vent xsd:type="integer">2</Vent>
</parameters>

As shown, both the POST and GET commands include the URL of the device in the device type field. As described below, this directs server 19 to a Web site associated with device 11 and, thereafter, in the case of a GET Command, to retrieve a specific Web page that is generated by server 19 for the device. It is noted that, since the POST command retrieves parameters, not a document like the GET command, the POST command need not include a URL of the device.

Referring back to FIG. 2, process 41 (in server 19) receives (202) the command from embedded controller 17. Process 41 identifies the command as either a POST or GET command based on a header, such as "POST/CONTROL HTTP/1.1" (see the headers in Appendices A and B), in the command. Process 41 uses an XML parser to parse (203) the various identifying fields, such as device type, serial number, and UUID, from the command.

Process 41 identifies (204) the instance of device 11 based on the information parsed from the command. That is, process 41 uses the device type, serial number, and UUID field information to identify the instance.

If the Command is a POST Command

The remaining identification information from the command is used to narrow the search through database 30 down to data for the specific instance of device 11. The device serial number and/or UUID are used to retrieve operational parameters specific to device 11.

Once the appropriate data has been identified (204), process 41 retrieves (205) that data using application logic 32. Process 41 compares the values of the operational parameters to those included in the POST command. If the values are the same, process 41 returns an indication that there are no new/updated values for device 11. If the values of the operational parameters are different, process 41 adds the appropriate updated value fields to the POST command and sends (206) the POST command, with the updated operational parameters, back to embedded controller 17.

Thus, only those operational parameters that differ from their original values are returned to embedded controller 17 in the POST command.

If the Command is a GET Command

As was the case above with the POST command, the remaining identification information from the command is used to narrow the search through database 30 down to data for the specific instance of device 11. In particular, the device serial number and/or UUID are used to retrieve (205) a configuration file that is specific to device 11. Process 41 then sends (206) the configuration file to embedded controller 17. The configuration file may be a Web page identified by the URL in the device type field. This Web page is generated by server 19 using parameters stored in database 30 and then sent to device 11. It is noted that the complete Web page itself need not be stored. Alternatively, the GET command may retrieve separate configuration files and Web pages.

Process 40 in embedded controller 17 receives (207) the data (operational parameters or configuration file) from server 19 in response to sending (201) the command. Process 40 then uses the data to update/reset device 11. For example, if device 11 is a heating system, a new operational parameter may be a new temperature setting for its thermostat. In this example, embedded controller 17 sets the new temperature accordingly. If the device is a television, a new operational parameter may indicate that certain pay television stations are now available. In this case, embedded controller 17 performs any appropriate decoding/descrambling functions on the television signal.

Alternative Embodiment

Figure 3:
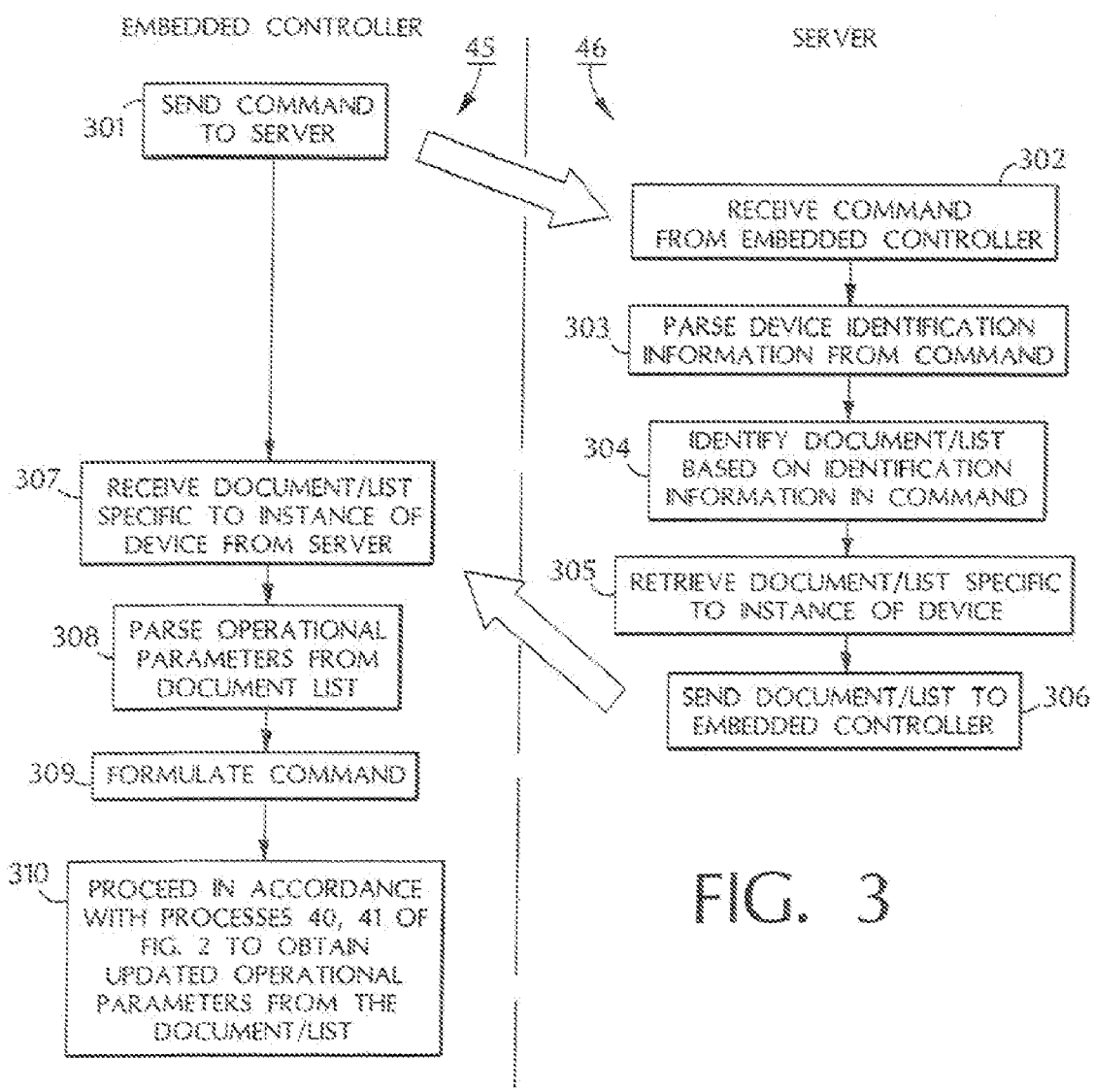
FIG. 3 is a flowchart showing an alternative process by which the embedded controller retrieves data for the device from the server.

FIG. 3 shows alternative embodiments of processes 40,41. In processes 40,41, the GET and POST commands request the same parameters each time the commands are issued. The parameters requested are encoded in the software to implement process 40. This embodiment provides a way to change the parameters that are requested without altering the software that generates the request/command.

Referring to FIG. 3, process 45 in embedded controller 17 begins by sending (301) a command to server 19. The command, in this case, is an HTTP GET command, since it is requesting a document, not individual operational parameters. The document is an XML document that contains a list of operational parameters to be updated. Using this document, embedded controller 17 can change the operational parameters that it periodically updates.

Process 46 in server 19 receives (302) the command from embedded controller 17, parses (303) the command using an XML parser to obtain the information specific to the instance of device 11, and identifies (304) the appropriate document based on this information. As before, the information that identifies the instance of device 11 includes, among other things, the device type, its serial number, and its UUID. Process 46 retrieves (305) the document containing the list of operational parameters to be updated, and sends (306) the document back to embedded controller 17.

Process 45 in embedded controller 17 receives (307) the document from server 19, parses (308) the operational parameters to be updated from the document, and formulates (309) a POST command to send to server 19. The command is formulated using a command template (not shown), into which process 45 inserts the operational parameters parsed from the document. Process 45 sends this second command to the server. At this point, processes 45 and 46 operate (310) in the same manner as processes 40 and 41, respectively, when used with a POST command. Accordingly, the details of processes 40,41 are not repeated here.

This alternative embodiment may be generalized further. For example, rather than simply retrieving a list of operational parameters, embedded controller 17 may retrieve, from server 19, a list of operations that it is to perform. For example, that list may contain operational parameters to be updated, times at which the updates are to occur, a schedule of diagnostic tests, and the like. Any operation that may be performed by embedded controller 17 may be included on the list.

The process for retrieving the list of operations is identical to processes 45 and 46, save for the contents of the list itself. The actions that embedded controller takes once it has the list (i.e., 310) depend on the contents of the list. For example, the list might specify that parameters are to be updated every hour and may also contain a list of the parameters to be updated. The list may contain XML commands, which can be parsed by embedded controller 17. Thus, embedded controller 17 reads the commands in the list and performs the appropriate operations with respect to device 11.

Architecture

Processes 40,41 and 45,46 are not limited to use with the hardware/software configuration of FIG. 1; they may find applicability in any computing or processing environment. Processes 40,41 and 45,46 may be implemented in hardware (e.g., an ASIC {Application-Specific Integrated Circuit} and/or an FPGA {Field Programmable Gate Array}), software, or a combination of hardware and software.

Processes 40,41 and 45,46 may be implemented using one or more computer programs executing on programmable computers that each includes a processor, a storage medium readable by the processor (including volatile and non-volatile memory and/or storage elements), at least one input device, and one or more output devices.

Each such program may be implemented in a high level procedural or object-oriented programming language to communicate with a computer system. Also, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform processes 40,41 and 45,46.

Processes 40,41 and 45,46 may also be implemented as a computer-readable storage medium, configured with a computer program, where, upon execution, instructions in the computer program cause the computer to operate in accordance with processes 40,41 and 45,46.

The invention is not limited to use with the protocols and standards described above. For example, Web server may use Java Servlets, ASP (Active Server Pages), and/or ISAPI (Internet Server Application Programming Interface) to communicate with application logic 32, instead of, or in addition to, CGI. The commands sent by embedded controller 17 and/or server 19 (e.g., in 201, 301, 310) are not limited to HTTP GET and POST commands. Any commands and/or requests for requesting and receiving data may be used.

The data transferred to embedded controller 17 by server 19 is not limited to operational parameters or configuration files. The data may include, for example, a schedule of actions to be performed by device 11 that is based on information pertaining the owner of the device. For example, owner preferences may be stored in database 30. The instance-specific data may be used by server 19 to correlate the owner of the device to the appropriate preferences. These preferences then may be transmitted back to device 11 to control the operation thereof.

The original parameters sent by embedded controller 17 to server 19 may be used by server 19 to calculate new, updated parameters based on data stored in database 30. Thus, the invention is not limited to simply retrieving updated data, but may also include calculating new data based on currently-available data.

The documents and commands described above are not limited to XML format. Any computer language may be used for the commands. The documents may be in any format, for example, HTML (Hypertext Markup Language) documents may be used. In addition, the invention is not limited to use with the Web, Web servers, and the like. The servers and embedded controllers described herein may be the same type of general-purpose computer appropriately programmed, or different devices.

Other embodiments not described herein are also within the scope of the following claims.

What is claimed is:

1. A method performed by a controller that monitors and/or controls an apparatus, the method comprising:
    polling a server by sending a message to the server periodically, the message containing information that distinguishes the apparatus from other like apparatuses, the message for establishing a connection between the server and the controller through which the instructions are sent;
    receiving, from the server and in response to the message, one or more of plural instructions that are supported by the controller; and
    using one or more of the instructions to affect at least one of:
        a configuration of the apparatus in response to an instruction that is configured to affect the configuration of the apparatus,
        an operation of the apparatus in response to an instruction that is configured to affect the operation of the apparatus, and
        an operation of the controller in response to an instruction that is configured to affect the operation of the controller;
    wherein, due to network addressing, the server cannot initiate communication to the controller to send instructions to the controller.

2. The method of claim 1, wherein the message comprises an operational parameter for the apparatus and at least one of the instructions comprises an updated value for the operational parameter.

3. The method of claim 2, wherein the message comprises plural operational parameters for the apparatus and at least one of the instructions comprises updated values that differ from current values of the operational parameters.

4. The method of claim 1, wherein at least one of the instructions comprises a list of operations to be performed by the controller; and
    using one or more of the instructions comprises:
        parsing the operations from the list; and
        performing the operations from the list.

5. The method of claim 1, wherein at least one of the instructions comprises a configuration file for the apparatus.

6. The method of claim 1, wherein the message identifies the apparatus by a type and/or one or more of a serial number and a universal unique identifier.

7. The method of claim 1, wherein the message comprises a hypertext transfer protocol (HTTP) message.

8. The method of claim 7, wherein the message comprises an HTTP command that contains Extensible Markup Language code.

9. The method of claim 1, wherein the server cannot initiate communication because the controller has a network address that the server cannot resolve.

10. A method performed by a server for sending instructions over a network to a controller that monitors and/or controls an apparatus, the method comprising:
receiving a message from the controller periodically, the message containing information that distinguishes the apparatus from other like apparatuses, the message for establishing a connection between the server and the controller through which instructions are sent;
identifying the apparatus from the information in the message;
retrieving one or more instructions that are specific to the apparatus, the one or more instructions comprising one or more of plural instructions that are supported by the controller; and
sending the one or more instructions from the server to the controller, the one or more instructions for affecting at least one of:
a configuration of the apparatus in response to an instruction that is configured to affect the configuration of the apparatus,
an operation of the apparatus in response to an instruction that is configured to affect the operation of the apparatus, and
an operation of the controller in response to an instruction that is configured to affect the operation of the controller;
wherein, due to network addressing, the server cannot initiate communication to the controller to send instructions to the controller.

11. The method of claim 10, wherein:
the information in the message comprises a type and/or one or more of a serial number and a universal unique identifier; and
the apparatus is identified based on the type and/or one or more of the serial number and the universal unique identifier.

12. The method of claim 11, further comprising:
parsing the type and one or more of the serial number and universal unique identifier from the message prior to identifying the apparatus.

13. The method of claim 10, wherein:
the message comprises an operational parameter for the device; and
the one or more instructions comprises an updated value of the operational parameter.

14. The method of claim 10, wherein the one or more instructions comprises a list of operations to be performed by the apparatus.

15. The method of claim 10, wherein the one or more instructions comprises a configuration file for the apparatus.

16. The method of claim 10, further comprising:
receiving data specific to the apparatus; and
storing the data in memory as part of the plural instructions;
wherein the one or more instructions are retrieved from the memory.

17. The method of claim 16, wherein the data specific to the apparatus is received via a Web page generated by the server.

18. The method of claim 10, wherein the message comprises a hypertext transfer protocol (HTTP) command that contains Extensible Markup Language (XML) code.

19. The method of claim 10, wherein the server cannot initiate communication because the controller has a network address that the server cannot resolve.

20. A system comprising:
a controller that monitors and/or controls an apparatus, the controller being capable of communicating over a computer network; and
a server that is capable of communicating over the computer network;
wherein (A) the controller polls the server periodically by sending a message to the server over the computer network, the message for establishing a connection between the server and the controller through which the instructions are sent, the message containing information that distinguishes the apparatus from other like apparatuses; and, in response to the message, (B) the server (i) identifies the apparatus based on the information in the message, (ii) retrieves one or more of plural instructions that are supported by the controller, and (iii) sends the one or more instructions to the controller over the computer network, the one or more instructions for affecting at least one of:
a configuration of the apparatus in response to an instruction that is configured to affect the configuration of the apparatus,
an operation of the apparatus in response to an instruction that is configured to affect the operation of the apparatus, and
an operation of the controller in response to an instruction that is configured to affect the operation of the controller;
wherein, due to network addressing, the server cannot initiate communication to the controller to send instructions to the controller.

21. The system of claim 20, wherein the server cannot initiate communication to the controller because the controller is not addressable from the computer network.

22. The system of claim 20, wherein the computer network comprises the Internet.

23. The system of claim 20, wherein the message comprises a hypertext transfer protocol (HTTP) command that contains Extensible Markup Language (XML) code.

24. The system of claim 20, wherein the server cannot initiate communication because the controller has a network address that the server cannot resolve.

25. A computer program stored on one or more machine-readable media, the computer program being executable by a controller that monitors and/or controls an apparatus, the computer program comprising code to cause the controller to:
poll a server by sending a message to the server periodically, the message containing information that distinguishes the apparatus from other like apparatuses, the message for establishing a connection between the server and the controller through which the instructions are sent;
receive, from the server and in response to the message, one or more of plural instructions that are supported by the controller; and
use one or more of the instructions to affect at least one of:

a configuration of the apparatus in response to an instruction that is configured to affect the configuration of the apparatus, an operation of the apparatus in response to an instruction that is configured to affect the operation of the apparatus, and an operation of the controller in response to an instruction that is configured to affect the operation of the controller;

wherein, due to network addressing, the server cannot initiate communication to the controller to send instructions to the controller.

26. The computer program of claim 25, wherein the message comprises an operational parameter for the apparatus and at least one of the instructions comprises an updated value for the operational parameter.

27. The computer program of claim 26, wherein the message comprises plural operational parameters for the apparatus and at least one of the instructions comprises updated values that differ from current values of the operational parameters.

28. The computer program of claim 25, wherein at least one of the instructions comprises a list of operations to be performed by the controller; and
wherein using at least one of the instructions comprises:
parsing the operations from the list; and
performing the operations from the list.

29. The computer program of claim 25, wherein at least one of the instructions comprises a configuration file for the apparatus.

30. The computer program of claim 25, wherein the information in the message identifies the apparatus by a type and/or one or more of a serial number and a universal unique identifier.

31. The computer program of claim 25, wherein the message comprises a hypertext transfer protocol (HTTP) message.

32. The computer program of claim 25, wherein the message comprises a hypertext transfer protocol (HTTP) command that contains Extensible Markup Language (XML) code.

33. The computer program of claim 25, wherein the server cannot initiate communication because the controller has a network address that the server cannot resolve.

34. A computer program stored on one or more machine-readable media, the computer program being executable by a server to send instructions over a network to a controller that monitors and/or controls an apparatus, the computer program comprising code to cause the server to:
receive a message from the controller periodically, the message containing information that distinguishes the apparatus from other like apparatuses, the message for establishing a connection between the server and the controller through which instructions are sent;
identify the apparatus from the information in the message;
retrieve one or more instructions that are specific to the apparatus, the one or more instructions comprising one or more of plural instructions that are supported by the controller; and
send the one or more instructions to the controller, the one or more instructions for affecting at least one of:
a configuration of the apparatus in response to an instruction that is configured to affect the configuration of the apparatus, an operation of the apparatus in response to an instruction that is configured to affect the operation of the apparatus, and an operation of the controller in response to an instruction that is configured to affect the operation of the controller;

wherein, due to network addressing, the server cannot initiate communication to the controller to send instructions to the controller.

35. The computer program of claim 34, wherein:
the information in the message comprises a type and/or one or more of a serial number and a universal unique identifier; and
the apparatus is identified based on the type and/or one or more of the serial number and the universal unique identifier.

36. The computer program of claim 35, further comprising code to cause the server to:
parse the type and one or more of the serial number and universal unique identifier from the message prior to identifying the apparatus.

37. The computer program of claim 34, wherein:
the message comprises an operational parameter for the apparatus; and
the one or more instructions comprises an updated value of the operational parameter.

38. The computer program of claim 34, wherein the one or more instructions comprises a list of operations to be performed by the apparatus.

39. The computer program of claim 34, wherein the one or more instructions comprises a configuration file for the apparatus.

40. The computer program of claim 34, further comprising code to cause the server to:
receive the data specific to the apparatus; and
store the data in memory as part of the plural instructions;
wherein the one or more instructions are retrieved from the memory.

41. The computer program of claim 40, wherein the data specific to the apparatus is received via a Web page generated by the server.

42. The computer program of claim 34, wherein the message comprises a hypertext transfer protocol (HTTP) command that contains Extensible Markup Language (XML) code.

43. The computer program of claim 34, wherein the server cannot initiate communication because the controller has a network address that the server cannot resolve.

44. A device to monitor and/or control an apparatus, the device comprising:
a controller which is configured to execute code to:
poll a server by sending a message to the server periodically, the message containing information that distinguishes the apparatus from other like apparatuses, the message for establishing a connection between the server and the controller through which the instructions are sent;
receive, from the server and in response to the message, one or more of plural instructions that are supported by the controller; and
use one or more of the instructions to affect at least one of:
a configuration of the apparatus in response to an instruction that is configured to affect the configuration of the apparatus, an operation of the apparatus in response to an instruction that is configured to affect the operation of the apparatus, and an operation of the controller in response to an instruction that is configured to affect the operation of the controller;

wherein, due to network addressing, the server cannot initiate communication to the controller to send instructions to the controller.

45. The device of claim 44, wherein the message comprises an operational parameter for the apparatus and at least one of the instructions comprises an updated value for the operational parameter.

46. The device of claim 45, wherein the message comprises plural operational parameters for the apparatus and at least one of the instructions comprises updated values that differ from current values of the operational parameters.

47. The device of claim 44, wherein at least one of the instructions comprises a list of operations to be performed by the controller; and wherein using at least one of the instructions comprises:
parsing the operations from the list; and
performing the operations from the list.

48. The device of claim 44, wherein at least one of the instructions comprises a configuration file for the apparatus.

49. The device of claim 44, wherein the information in the message identifies the apparatus by a type and/or one or more of a serial number and a universal unique identifier.

50. The device of claim 44, wherein the message comprises a hypertext transfer protocol (HTTP) message.

51. The device of claim 44, wherein the message comprises a hypertext transfer protocol (HTTP) command that contains Extensible Markup Language (XML) code.

52. The device of claim 44, wherein the server cannot initiate communication because the controller has a network address that the server cannot resolve.

53. A device for sending data over a network to a remote controller that monitors and/or controls an apparatus, the device comprising:

a local controller configured to execute code to:
identify the apparatus from the information in the message;
retrieve one or more instructions that are specific to the apparatus, the one or more instructions comprising one or more of plural instructions that are supported by the remote controller; and
send the one or more instructions to the remote controller, the one or more instructions for affecting at least one of:
a configuration of the apparatus in response to an instruction that is configured to affect the configuration of the apparatus,
an operation of the apparatus in response to an instruction that is configured to affect the operation of the apparatus, and
an operation of the remote controller in response to an instruction that is configured to affect the operation of the controller;

wherein, due to network addressing, the local controller cannot initiate communication to the remote controller to send instructions to the controller.

54. The device of claim 53, wherein:
the information in the message comprises a type and/or one or more of a serial number and a universal unique identifier; and the apparatus is identified based on the type and/or one or more of the serial number and the universal unique identifier.

55. The device of claim 54, wherein the local controller executes code to:
parse the type and one or more of the serial number and universal unique identifier from the command prior to identifying the apparatus.

56. The device of claim 53, wherein:
the message comprises an operational parameter for the apparatus; and
the one or more instructions comprises an updated value of the operational parameter.

57. The device of claim 53, wherein the one or more instructions comprises a list of operations to be performed by the apparatus.

58. The device of claim 53, wherein the one or more instructions comprises a configuration file for the apparatus.

59. The device of claim 53, wherein:
the local controller executes code to:
receive data specific to the apparatus; and
store the data in memory as part of the plural instructions.

60. The device of claim 59, wherein the data specific to the apparatus is received via a Web page generated by the device.

61. The device of claim 53, wherein the message comprises a hypertext transfer protocol (HTTP) command that contains Extensible Markup Language (XML) code.

62. The device of claim 53, wherein the local controller cannot initiate communication because the remote controller has a network address that the local controller cannot resolve.

63. A method performed by a controller that monitors and/or controls an apparatus, the method comprising:
polling a server for messages periodically, wherein polling comprises initiating communication with the server by sending a first message to the server, the first message for identifying the apparatus and for establishing a connection between the server and the controller through which the instructions are sent;
receiving a first reply message from the server in response to the first message, the first reply message identifying a parameter;
sending a second message to the server in response to the first reply message, the second message containing the parameter identified in the first reply message;
receiving a second reply message containing an updated version of the parameter; and
using the updated version of the parameter to affect at least one of:
a configuration of the apparatus if the parameter relates to the configuration of the apparatus,
an operation of the apparatus if the parameter relates to operation of the apparatus, and
an operation of the controller if the parameter relates to operation of the controller;
wherein the server cannot initiate communication to the controller because the server cannot resolve a network address of the controller.

64. The method of claim 63, further comprising adjusting a time interval at which polling the server takes place.

65. The method of claim 63, wherein the server cannot resolve a network address of the controller because the server and the controller are on different networks.

66. The method of claim 63, wherein the first message and the second message comprise Hypertext Transfer Protocol commands.

67. A computer program stored on one or more machine-readable media, the computer program comprising code that is executable by a controller configured to monitor and/or control an apparatus, the code causing the controller to:
- poll a server for messages periodically, wherein polling comprises initiating communication with the server by sending a first message to the server, the first message for identifying the apparatus and for establishing a connection between the server and the controller through which the instructions are sent;
- receive a first reply message from the server in response to the first message, the first reply message identifying a parameter;
- send a second message to the server in response to the first reply message, the second message containing the parameter identified in the first reply message;
- receive a second reply message containing an updated version of the parameter; and
- use the updated version of the parameter to affect at least one of:
  - a configuration of the apparatus if the parameter relates to the configuration of the apparatus,
  - an operation of the apparatus if the parameter relates to operation of the apparatus, and
  - an operation of the controller if the parameter relates to operation of the controller;
- wherein the server cannot initiate communication to the controller because the server cannot resolve a network address of the controller.

68. The computer program of claim 67, further comprising code to cause the controller to adjust a time interval at which polling the server takes place.

69. The computer program of claim 67, wherein the server cannot resolve a network address of the controller because the server and the controller are on different networks.

70. The computer program of claim 67, wherein the first message and the second message comprise Hypertext Transfer Protocol commands.

71. A device comprising:
a controller that monitors and/or controls an apparatus, the controller executing code to:
- poll a server for messages periodically, wherein polling comprises initiating communication with the server by sending a first message to the server, the first message for identifying the apparatus and for establishing a connection between the server and the controller through which the instructions are sent;
- receive a first reply message from the server in response to the first message, the first reply message identifying a parameter;
- send a second message to the server in response to the first reply message, the second message containing the parameter identified in the first reply message;
- receive a second reply message containing an updated version of the parameter; and
- use the updated version of the parameter to affect at least one of:
  - a configuration of the apparatus if the parameter relates to the configuration of the apparatus,
  - an operation of the apparatus if the parameter relates to operation of the apparatus, and
  - an operation of the controller if the parameter relates to operation of the controller;
- wherein the server cannot initiate communication to the controller because the server cannot resolve a network address of the controller.

72. The device of claim 71, wherein the controller executes code to adjust a time interval at which polling the server takes place.

73. The device of claim 71, wherein the server cannot resolve a network address of the controller because the server and the controller are on different networks.

74. The device of claim 71, wherein the first message and the second message comprise Hypertext Transfer Protocol commands.

* * * * *

UNITED STATES PATENT AND TRADEMARK OFFICE
CERTIFICATE OF CORRECTION

PATENT NO. : 7,185,014 B1 Page 1 of 1
APPLICATION NO. : 09/667737
DATED : February 27, 2007
INVENTOR(S) : James R. Hansen It is certified that error appears in the above-identified patent and that said Letters Patent is hereby corrected as shown below:

Column 8, Claim 1, Line 32:
Delete "which the instructions" and Insert --which instructions--

Column 10, Claim 20, Lines 19 to 20:
Delete "through which the instructions" and Insert --through which instructions--

Column 10, Claim 25, Line 61:
Delete "which the instructions" and Insert --which instructions--

Column 12, Claim 44, Lines 58 to 59:
Delete "through which the instructions" and Insert --through which instructions--

Column 14, Claim 63, Line 40:
Delete "through which the instructions" and Insert --through which instructions--

Column 15, Claim 67, Line 10:
Delete "through which the instructions" and Insert --through which instructions--

Column 16, Claim 71, Line 9:
Delete "through which the instructions" and Insert --through which instructions--

Signed and Sealed this

Second Day of June, 2009

JOHN DOLL
*Acting Director of the United States Patent and Trademark Office*